United States Patent
Babbel et al.

[11] Patent Number: 5,899,951
[45] Date of Patent: May 4, 1999

[54] METHOD FOR CONTROLLING A CLUTCH IN THE DRIVE TRAIN OF A MOTOR VEHICLE WITH FOUR-WHEEL DRIVE

[75] Inventors: Eckhard Babbel, Brunswick; Roman Gabrisch, Gifhorn, both of Germany

[73] Assignee: Volkswagen AG, Wolfsburg, Germany

[21] Appl. No.: 08/838,438

[22] Filed: Apr. 7, 1997

[30] Foreign Application Priority Data

Apr. 6, 1996 [DE] Germany ............ 196 13 841

[51] Int. Cl.$^6$ ............ G06F 17/00; G06F 19/00; G06F 7/00
[52] U.S. Cl. ............ 701/67; 701/69; 180/197
[58] Field of Search ............ 701/69, 67; 180/197, 180/233, 248, 249; 477/39

[56] References Cited

U.S. PATENT DOCUMENTS

| | | | |
|---|---|---|---|
| 4,711,333 | 12/1987 | Okamura | 192/0.076 |
| 4,866,624 | 9/1989 | Nishikawa et al. | 180/249 |
| 4,889,204 | 12/1989 | Furuya et al. | 180/197 |
| 4,890,686 | 1/1990 | Hamada et al. | 180/233 |
| 4,937,750 | 6/1990 | Gilliam | 180/248 |
| 4,989,686 | 2/1991 | Miller et al. | 180/197 |
| 5,168,955 | 12/1992 | Naito | 180/197 |
| 5,301,768 | 4/1994 | Ishikawa et al. | 180/249 |
| 5,459,791 | 10/1995 | Jostins et al. | 381/102 |
| 5,570,755 | 11/1996 | Fruhwirth et al. | 180/249 |
| 5,701,247 | 12/1997 | Sasaki | 180/197 |

*Primary Examiner*—William A. Cuchlinski, Jr.
*Assistant Examiner*—Tim Wyckoff
*Attorney, Agent, or Firm*—Baker & Botts, L.L.P.

[57] ABSTRACT

A method of controlling a controllable clutch in the drive train between a front axle and a rear axle of a motor vehicle having four-wheel drive including determining the rotational speed of each of the wheels with a wheel-speed sensor, supplying output signals from the sensor to an evaluation unit having a data memory, determining, from the wheel radii stored in the evaluation unit and from the difference between the averaged rotational speeds of the wheels of the front axle and the averaged rotational speeds of the wheels of the rear axle, a theoretical rotational-speed difference for cornering without wheel slip in the clutch, and generating a control signal for operation of the clutch in such a way that a constant basic transmitted torque is set in the clutch.

8 Claims, 3 Drawing Sheets

METHOD FOR CONTROLLING A CLUTCH IN THE DRIVE TRAIN OF A MOTOR VEHICLE WITH FOUR-WHEEL DRIVE

BACKGROUND OF THE INVENTION

This invention relates to methods for controlling controllable clutches in the drive train between a front axle and a rear axle of a motor vehicle having four-wheel drive, in which each of the wheels has a wheel-speed sensor providing an output signal which is supplied to an evaluation unit with a data memory.

German Patent No. 37 21 626 C2 discloses a clutch control arrangement of this type in which the wheel speed is determined by wheel-speed sensors. In that clutch control arrangement an actuator acts on the clutch in such a way as to reduce the torque transmitted if the time derivative of a reduction in wheel speed exceeds a predetermined value. A clutch control system of this kind thus improves only the braking behavior and does not take into account exceptional situations, for example, spinning of the wheels. Moreover, clutch control distortions which can occur during cornering because of the rotational speed differences produced in the clutch, due to different front and rear wheel speed differences during cornering or due to different wheel radii, are not taken into account.

German Offenlegungsschrift No. 43 27 507 A1 discloses a clutch arrangement for heavy vehicles used on difficult terrain. In this case, however, lock-up clutches are provided for each of the front and rear axle differentials and a selectable clutch is included between the front and rear axles.

German Patent No. 35 04 455 C3 discloses a drive control arrangement for a road vehicle which includes three locking differentials. In this control arrangement, the only control positions provided are "locking differential locked" and "locking differential unlocked". There are no intermediate positions provided for the purpose of varying the torque transmitted by the locking differentials.

SUMMARY OF THE INVENTION

Accordingly, it is an object of the present invention to provide a method for controlling a clutch in the drive train of a four-wheel drive vehicle which overcomes the disadvantages of the prior art.

Another object of the invention is to provide a method for controlling a clutch in the drive train between the front and the rear axles of a four-wheel drive vehicle so that distortions in the clutch are avoided and to provide rules for opening and closing the clutch in exceptional driving situations.

A further object of the invention is to provide a method for controlling a drive train clutch in accordance with predetermined rules for opening and closing the clutch in exceptional driving situations.

These and other objects of the invention are attained by determining a theoretical rotational speed difference between the two clutch halves which would be produced by driving in a basic driving situation without wheel slip and converting this speed difference into a control signal which is used to control a controllable clutch between the front axle and the rear axle of a four-wheel drive vehicle so that a predetermined basic torque is transmitted by the clutch.

The theoretical rotational speed difference between the clutch halves for driving without wheel slip is calculated from the vehicle turning radius, the speed of travel and the radii of the different wheels. The different wheel radii can, for example, be determined by comparing the wheel speeds which have been recorded and averaged over a relatively long period of time or they may be determined by measuring the rotational-speed differences during a period of straight-ahead travel without wheel slip. The vehicle turning radius can be measured, for example, by a steering angle sensor or it can be determined empirically by calculation. If exceptional driving conditions are detected, for example, by exceeding or undershooting predetermined limit values for the signals from wheel speed sensors or from an engine control unit, the clutch is opened or closed after interrogation algorithms stored in the data memory are carried out.

In exceptional driving situations, such as, for example, braking operations, an interrogation algorithm determines when the rotation of the front wheels exceeds that of the rear wheels by more than a predetermined amount or when an ABS operation is activated, causing the clutch to be partially or completely opened. By opening the clutch in such situations, a loss of stability when braking on a split-coefficient surface or during an ABS braking operation is avoided. In other exceptional situations such as "spinning of the wheels" or "load change", other interrogation sequences are carried out, resulting in a corresponding opening or closing of the clutch.

In a situation in which less than all of the wheel speed sensors detect wheel speeds greater than a predetermined limit value or in which at least one of the wheel speed sensors is not providing a signal, other interrogation sequences are carried out, resulting in corresponding opening or closing of the clutch.

Distortions in the clutch as the vehicle rolls to a halt or drives away are thereby avoided and spinning of the wheels during drive-away acceleration is prevented.

At a high clutch temperature, which can occur during a sporty style of driving or because of different wheel radii, the energy consumption of the clutch must be reduced in order to avoid further heating. For this purpose, the torque transmitted by the clutch is reduced to an appropriate extent when a temperature above a predetermined value is sensed by a temperature sensor in the clutch.

If a plurality of exceptional driving situations exist simultaneously, the interrogation algorithms are prioritized. If one of the interrogation algorithms leads to a change in the basic transmitted torque in the clutch, the performance of the algorithms in accordance with the priority sequence begins again. If none of the interrogation algorithms leads to a transmitted torque which deviates from the basic transmitted torque, the basic transmitted torque is set and the interrogation cycle is repeated. This prioritization takes into account the differing significance of various exceptional driving situations.

For reasons of comfort, torque jumps should be avoided. For this purpose, alterations in the transmitted torque are carried out using a time ramp stored in the data memory.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
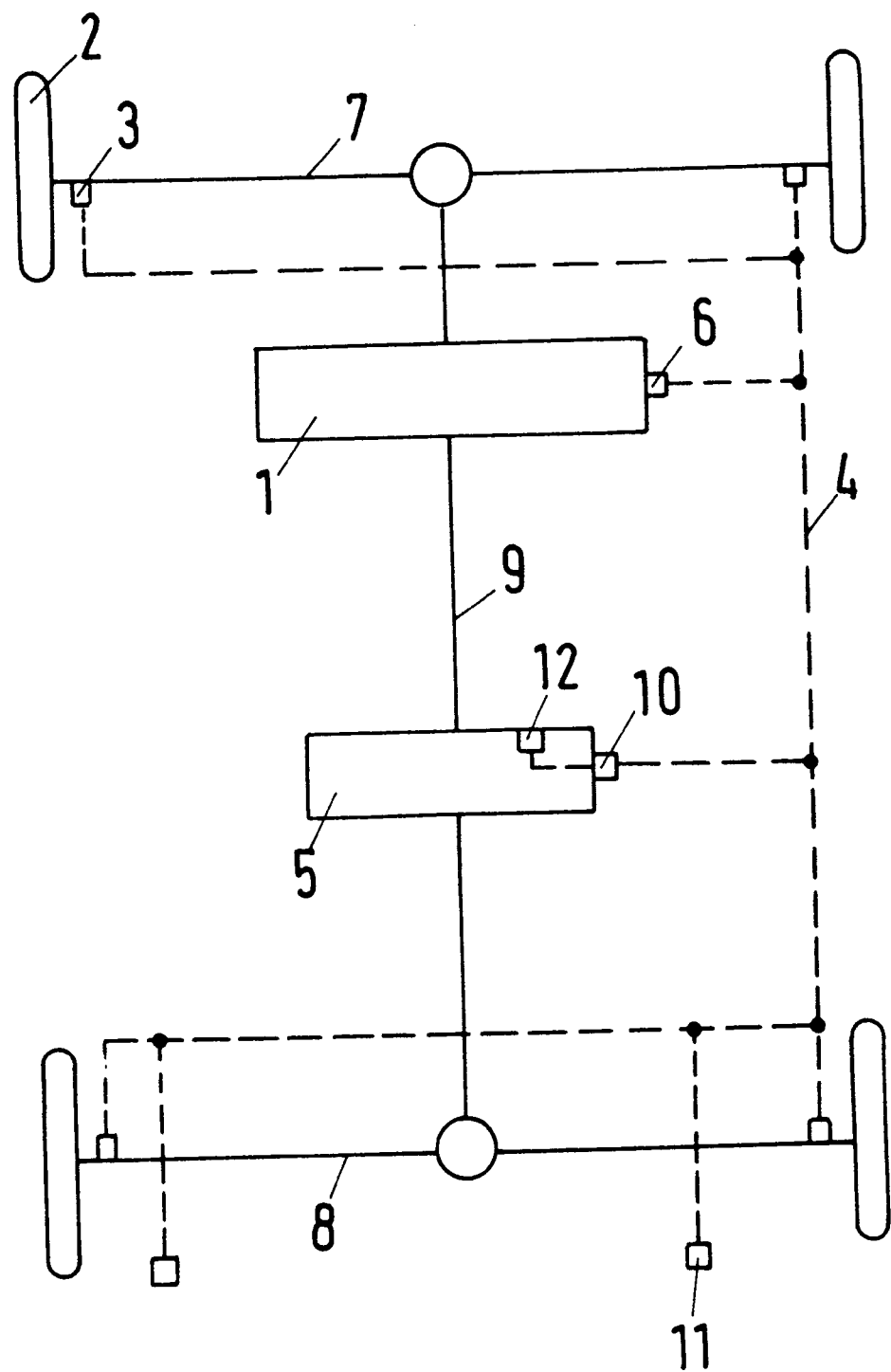
FIG. 1 is a schematic diagram illustrating an arrangement of sensors for controlling a controllable clutch in a four-wheel drive vehicle in accordance with a representative embodiment of the invention.

In the typical arrangement shown in FIG. 1, a motor vehicle is driven by an engine 1 connected through a drive train 9 to a front axle 7 and to a rear axle 8. A controllable clutch 5 is incorporated into the drive train 9 between the engine 1 and the rear axle 8. The clutch 5 is provided with an evaluation unit 10 having an internal data memory. The evaluation unit 10 with its data memory receives and processes signals which are transmitted by signal lines 4 from an engine control unit 6, a brake light 11, a temperature sensor 12 and four wheel speed sensors 3, each associated with one of the vehicle wheels 2. After the evaluation unit 10 has carried out interrogations based on interrogation algorithms stored in its data memory, it causes the clutch to be closed or opened by a clutch actuator (not shown).

The theoretical rotational speed difference between the front axle 7 and the rear axle 8 for driving without any wheel slip can be determined, for example, from a turn radius estimation and a subsequent empirical calculation or by measuring the turn radius by a steering angle sensor (not shown), and from the vehicle speed and any differences in the radii of the wheels. This theoretical rotational speed difference is then used to control the clutch in such a way that a constant basic transmitted torque for the clutch is obtained as a function of the theoretical rotational speed difference between the two clutch halves.

Figure 2:
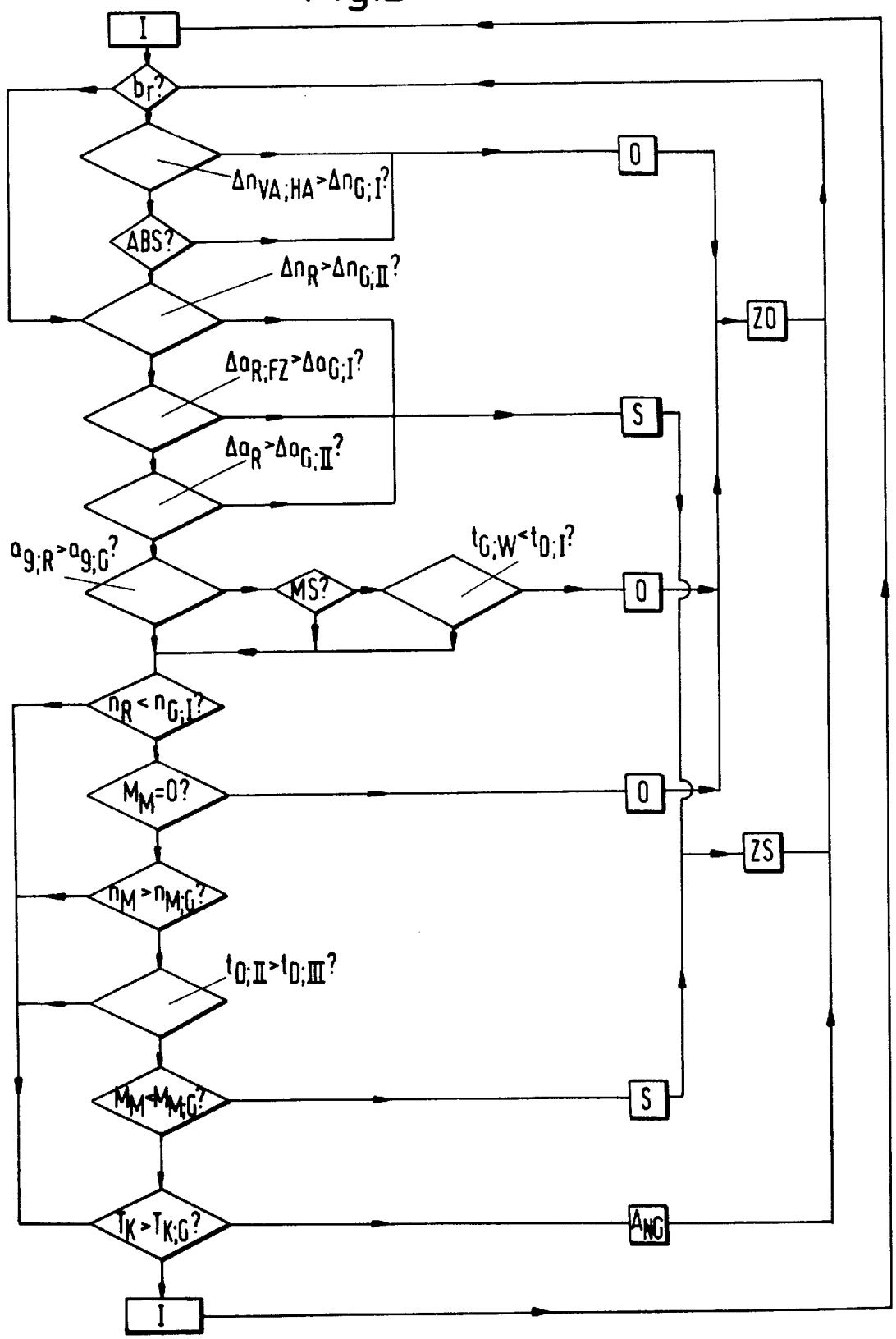
FIG. 2 is a schematic flow diagram showing the steps carried out by an interrogation algorithm according to a representative embodiment of the invention.

FIG. 2 shows a representative interrogation algorithm used in accordance with the invention. If a brake actuation "$b_r$" is sensed and an instantaneous rotational speed difference $\Delta n_{VA;HA}$ between the averaged rotational speeds of the wheels 2 of the front axle 7 and the averaged rotational speeds of the wheels 2 of the rear axle 8 which is greater than a predetermined limit value $\Delta n_{G;I}$ is sensed, or an ABS braking operation "ABS" is sensed, the clutch 5 is completely or partially opened as indicated by "O". As a result of opening of the clutch 5, a lower transmitted torque, adapted to the exceptional driving situation of "braking" is produced by the clutch 5. The sensing of the brake actuation "$b_r$" can, for example, be accomplished by the detection of a brake signal to the brake light 11. The wheel speeds $n_R$ are determined from signals provided by the wheel-speed sensors 3. The evaluation unit 10 averages the wheel speeds $n_R$ of the front axle 7 and the wheel speeds $n_R$ of the rear axle 8, and evaluates the clutch condition required as a result of the performance of the interrogation algorithm stored in the data memory.

If the performance of that algorithm does not lead to opening of the clutch 5, the basic transmitted torque $M_G$ of the initial state I continues to be transmitted and the next interrogation algorithm step is called up from the memory. In the next interrogation step, the system inquires whether the wheel-speed sensors 3 are sensing rotational speed differences $\Delta n_R$ between the individual wheels 2 which are greater than a predetermined limit value $\Delta n_{G;II}$. If the answer to that question is yes, the clutch 5 is completely or partially closed as indicated by "S". If the rotational speed difference criterion is not satisfied, the system inquires whether there are acceleration differences $\Delta a_{R;FZ}$ between the acceleration of the individual wheels 2 and the acceleration of the vehicle which are greater than a predetermined limit $\Delta a_{G;II}$. If that question is answered yes, the clutch is completely or partially closed as indicated by S. These interrogation steps take into account the exceptional driving situation of "spinning of the wheels".

If none of the above-mentioned criteria is met, the next interrogation sequence, which is intended to allow for the exceptional driving situation of a "load change" is carried out. The clutch 5 is completely or partially opened if the lateral acceleration of the individual wheels $a_{g;R}$ is greater than a predetermined limit value $a_{g;G}$ and the engine control unit 6 senses that the engine is in overrun operation MS and the time since the accelerator was released $t_{G;W}$ has exceeded a specified time $t_{D;I}$.

If none of the above criteria is met, the basic transmitted torque remains unaltered and the next interrogation sequence, which allows for the exceptional driving situation of "rolling to a halt" and "driving away", is performed. In the first interrogation step, the system inquires whether the wheel-speed sensors 3 are sensing rotational speeds $n_R$ of the wheels 2 which are less than a specified limit value $n_{G;I}$ or at least one wheel-speed sensor 3 is not delivering any signal. If such is the case and the engine torque $M_M$ demanded by the driver is equal to zero, the clutch is completely or partially opened as indicated by O. If the engine torque $M_M$ demanded by the driver is not equal to zero, the clutch 5 is closed if an engine speed $n_M$ greater than a predetermined limit value $n_{M;G}$ is sensed during a time $t_{D;II}$ greater than a specified time $t_{D;III}$ and engine torque $M_M$ demanded by the driver and less than a specified limit $M_{M;G}$. This interrogation sequence allows the exceptional driving situation of "driving away".

If these criteria are not met, the basic transmitted torque is maintained and, in a following interrogation step, the system inquires whether a temperature $T_K$ greater than a specified limit value $T_{K;G}$ is being sensed by the temperature sensor 12 in the clutch. If this criterion is fulfilled, an adapted basic transmitted torque $A_{GM}$ is set. The temperature $T_K$ in the clutch 5 can increase, for example, due to a sporty style of driving. The setting of the adapted basic transmitted torque $A_{GM}$ prevents the clutch 5 from heating up further.

If none of the above-mentioned interrogation criteria leads to an alteration of the basic transmitted torque $M_G$, the basic transmitted torque $M_G$ remains unaltered. If one of the interrogation algorithms given above leads to an alteration of the basic transmitted torque, the closing and opening of the clutch 5 is performed using the "close clutch" ZS time ramp or the "open clutch" ZO time ramp which are stored in the data memory of the evaluation unit 10. The interrogation algorithm then begins again. The differing significance of the exceptional driving situations is then taken into account by the order of the interrogation algorithms.

Figure 3:
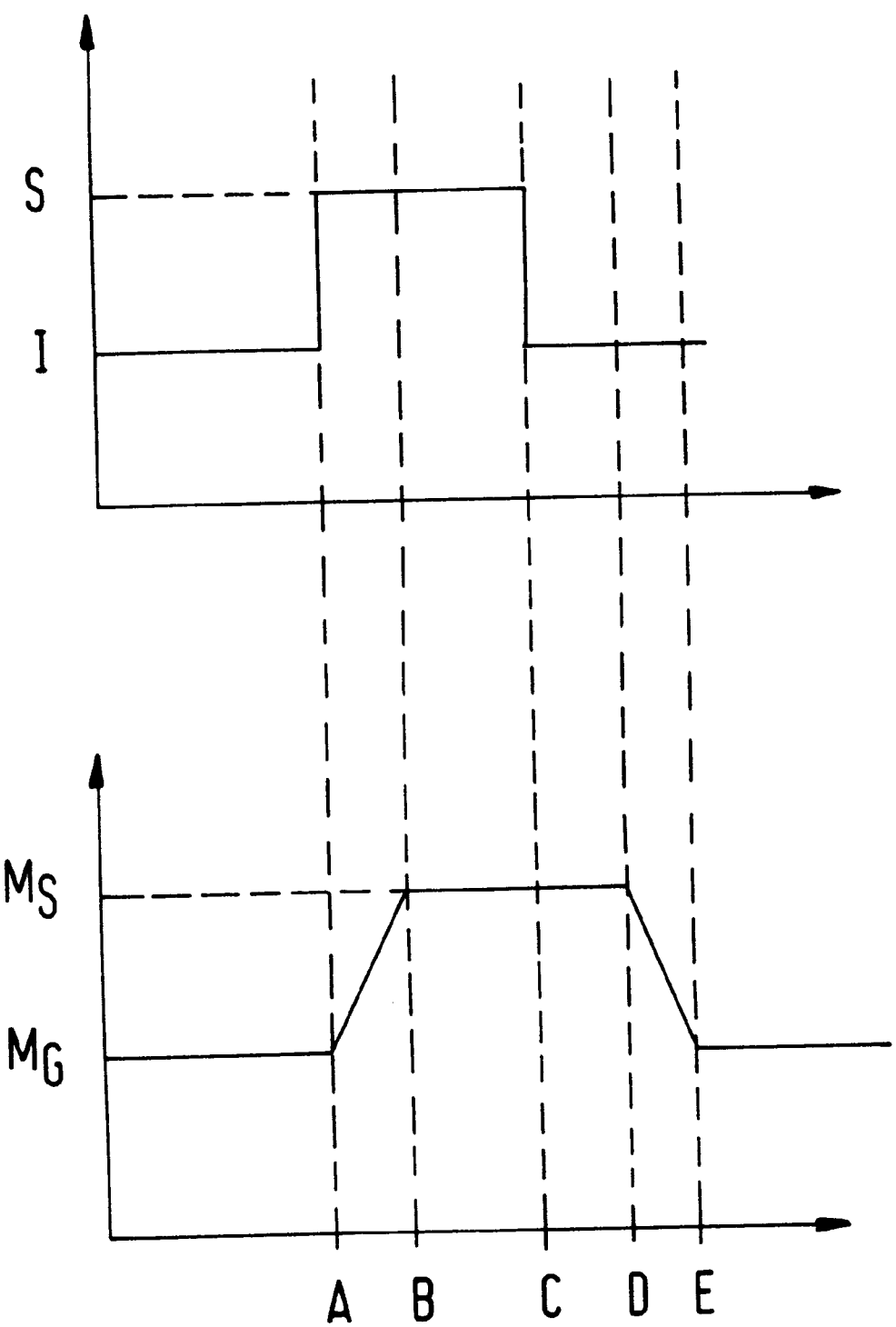
FIG. 3 is a graphical representation illustrating the opening and closing of the clutch under time-ramp control.

FIG. 3 shows the opening and closing of the clutch in accordance with the opening time ramp ZO and the closing time ramp ZS, respectively, as a consequence of an "open" or "close" clutch command from the evaluation unit. If the evaluation unit 10 detects an exceptional driving situation leading to an alteration of the basic transmitted torque $M_G$, the "close clutch" command S is transmitted at a time A in the example illustrated in FIG. 3, and, consequently, a "close clutch" ZS time ramp stored in the data memory is called up and executed during the time interval A–B, leading to the "clutch closed" S state, in which the transmitted torque $M_S$ is transmitted.

At a time C, the evaluation unit detects a change in the driving situation resulting in the "open clutch" command O. After receipt of that command, the transmitted torque is maintained during a predetermined time delay interval C–D in order to avoid unnecessarily frequent opening and closing of the clutch. Following the time delay interval at time D, the "open clutch" time ramp ZO is executed during a time interval D–E. After the completion of the time ramp at time E, the new torque, in this case the basic torque $M_G$, is transmitted by the clutch.

Although the invention has been described herein with reference to specific embodiments, many modifications and variations therein will readily occur to those skilled in the art. Accordingly, all such variations and modifications are included within the intended scope of the invention.

We claim:

1. A method for controlling a controllable clutch having an input and an output in a drive train between a front axle and a rear axle of a four-wheel drive vehicle comprising the steps of:

detecting the rotational speed of each of the wheels in the vehicle and providing corresponding signals to an evaluation unit having a data memory;

averaging the detected rotational speeds of the wheels at the front axle and averaging the detected rotational speeds of the wheels at the rear axle in the evaluation unit;

determining a theoretical rotational speed difference for the input and output of the clutch for vehicle cornering without wheel slip from stored wheel radii data and from the difference between the averaged rotational speeds of the wheels of the front axle and the wheels of the rear axle;

generating a control signal for the clutch from this theoretical difference in such a way that a constant basic transmitted torque is set in the clutch;

calling up interrogation algorithms stored in the data memory of the evaluation unit for predetermined exceptional driving situations;

generating a clutch control signal from the result of the interrogation algorithms; and opening and closing the clutch completely or partially in accordance with the clutch control signal;

wherein, in accordance with a stored braking algorithm:
   if a brake actuation is sensed; and
   an instantaneous rotational speed difference between the wheels of the front axle and the wheels of the rear axle greater than a predetermined limit value is sensed; or
   an ABS braking operation is detected;
   the clutch is completely or partially opened.

2. A method according to claim 1 wherein, in accordance with a stored wheel spinning algorithm:
   if a rotational speed difference between the individual wheels which is not due to cornering, and which is greater than a predetermined limit value, is sensed; or
   an acceleration difference between the acceleration of the individual wheels and the acceleration of the vehicle which is greater than a predetermined limit value is sensed; or
   an acceleration difference between individual wheels which is greater than a predetermined limit value is sensed;
   the clutch is completely or partially closed.

3. A method for controlling a controllable clutch having an input and an output in a drive train between a front axle and a rear axle of a four-wheel drive vehicle comprising the steps of:

detecting the rotational speed of each of the wheels in the vehicle and providing corresponding signals to an evaluation unit having a data memory;

averaging the detected rotational speeds of the wheels at the front axle and averaging the detected rotational speeds of the wheels at the rear axle in the evaluation unit;

determining a theoretical rotational speed difference for the input and output of the clutch for vehicle cornering without wheel slip from stored wheel radii data and from the difference between the averaged rotational speeds of the wheels of the front axle and the wheels of the rear axle;

generating a control signal for the clutch from this theoretical difference in such a way that a constant basis transmitted torque is set in the clutch;

calling up interrogation algorithms stored in the data memory of the evaluation unit for predetermined exceptional driving situations;

generating a clutch control signal from the result of the interrogation algorithms; and opening and closing the clutch completely or partially in accordance with the clutch control signal;

wherein, in accordance with a stored load change algorithm:
   if a lateral acceleration value of the individual wheels which is greater than a predetermined limit value is sensed; and
   the vehicle engine is in overrun operation; and
   the time since the vehicle accelerator was released is less than a predetermined time;
   the clutch is completely or partially opened.

4. A method for controlling a controllable clutch having an input and an output in a drive train between a front axle and a rear axle of a four-wheel drive vehicle comprising the steps of:

detecting the rotational speed of each of the wheels in the vehicle and providing corresponding signals to an evaluation unit having a data memory;

averaging the detected rotational speeds of the wheels at the front axle and averaging the detected rotational speeds of the wheels at the rear axle in the evaluation unit;

determining a theoretical rotational speed difference for the input and output of the clutch for vehicle cornering without wheel slip from stored wheel radii data and from the difference between the averaged rotational speeds of the wheels of the front axle and the wheels of the rear axle;

generating a control signal for the clutch from this theoretical difference in such a way that a constant basis transmitted torque is set in the clutch;

calling up interrogation algorithms stored in the data memory of the evaluation unit for predetermined exceptional driving situations;

generating a clutch control signal from the result of the interrogation algorithms; and opening and closing the clutch completely or partially in accordance with the clutch control signal;

wherein, in accordance with a stored coasting algorithm:
   if the rotational speed of the wheels is less than a predetermined limit value; and
   the engine torque demanded by the driver is equal to zero;
   the clutch is completely or partially opened.

5. A method for controlling a controllable clutch having an input and an output in a drive train between a front axle and a rear axle of a four-wheel drive vehicle comprising the steps of:

detecting the rotational speed of each of the wheels in the vehicle and providing corresponding signals to an evaluation unit having a data memory;

averaging the detected rotational speeds of the wheels at the front axle and averaging the detected rotational speeds of the wheels at the rear axle in the evaluation unit;

determining a theoretical rotational speed difference for the input and output of the clutch for vehicle cornering without wheel slip from stored wheel radii data and from the difference between the averaged rotational speeds of the wheels of the front axle and the wheels of the rear axle;

generating a control signal for the clutch from this theoretical difference in such a way that a constant basis transmitted torque is set in the clutch;

calling up interrogation algorithms stored in the data memory of the evaluation unit for predetermined exceptional driving situations;

generating a clutch control signal from the result of the interrogation algorithms; and opening and closing the clutch completely or partially in accordance with the clutch control signal;

wherein, in accordance with a stored driving away algorithm;
if the rotational speed of the wheels is less than a predetermined limit value; and
an engine speed greater than a predetermined limit value is sensed during a time interval greater than a predetermined specified time interval; and
an engine torque less than a predetermined limit value is sensed;
the clutch is completely or partially closed.

6. A method according to claim 1 wherein, in accordance with a stored clutch temperature algorithm:
if a temperature in the clutch which is greater than a predetermined limit value is sensed;
the basic transmitted torque in the clutch is reduced.

7. A method for controlling a controllable clutch having an input and an output in a drive train between a front axle and a rear axle of a four-wheel drive vehicle comprising the steps of:

detecting the rotational speed of each of the wheels in the vehicle and providing corresponding signals to an evaluation unit having a data memory;

averaging the detected rotational speeds of the wheels at the front axle and averaging the detected rotational speeds of the wheels at the rear axle in the evaluation unit;

determining a theoretical rotational speed difference for the input and output of the clutch for vehicle cornering without wheel slip from stored wheel radii data and from the difference between the averaged rotational speeds of the wheels of the front axle and the wheels of the rear axle;

generating a control signal for the clutch from this theoretical difference in such a way that a constant basis transmitted torque is set in the clutch;

calling up interrogation algorithms stored in the data memory of the evaluation unit for predetermined exceptional driving situations;

generating a clutch control signal from the result of the interrogation algorithms; and opening and closing the clutch completely or partially in accordance with the clutch control signal;

wherein the opening or closing of the clutch takes place after sequential execution of interrogation algorithms for determining exceptional braking, wheel spinning, load change, coasting, driving away, and clutch temperature situations, in that order.

8. A method according to claim 2 including the step of:
opening and closing the clutch under a time ramp control.

* * * * *

UNITED STATES PATENT AND TRADEMARK OFFICE
CERTIFICATE OF CORRECTION

PATENT NO. : 5,899,951
DATED : May 4, 1999
INVENTOR(S) : Babbel, et al.

It is certified that error appears in the above-identified patent and that said Letters Patent is hereby corrected as shown below:

Column 8, line 35, "claim 2" should read -- claim 1 --.

Signed and Sealed this

Nineteenth Day of September, 2000

Attest:

Q. TODD DICKINSON

*Attesting Officer*  *Director of Patents and Trademarks*